(12) United States Patent
Simonson

(10) Patent No.: US 6,803,930 B1
(45) Date of Patent: Oct. 12, 2004

(54) FACILITATING CONTENT VIEWING DURING NAVIGATION

(75) Inventor: Howard C. Simonson, San Jose, CA (US)

(73) Assignee: Adobe Systems Incorporated, San Jose, CA (US)

(*) Notice: Subject to any disclaimer, the term of this patent is extended or adjusted under 35 U.S.C. 154(b) by 0 days.

(21) Appl. No.: 09/461,748

(22) Filed: Dec. 16, 1999

(51) Int. Cl.[7] .................................................. G09G 5/00
(52) U.S. Cl. ........................ 345/784; 345/854; 345/853; 345/781; 345/759
(58) Field of Search .............................. 345/684, 157, 345/332, 341, 340, 357, 356, 418, 474, 759, 784, 781, 854, 853; 715/530, 531

(56) References Cited

U.S. PATENT DOCUMENTS

| | | | |
|---|---|---|---|
| 5,371,846 A | * 12/1994 | Bates ........................ | 345/157 |
| 5,510,808 A | * 4/1996 | Cina, Jr. et al. ............ | 345/123 |
| 5,522,025 A | * 5/1996 | Rosenstein .................. | 345/158 |
| 5,532,715 A | 7/1996 | Bates et al. | |
| 5,874,961 A | * 2/1999 | Bates et al. ................. | 345/341 |
| 6,049,334 A | * 4/2000 | Bates et al. ................. | 345/759 |
| 6,252,594 B1 | * 6/2001 | Xia et al. .................... | 345/341 |
| 6,476,831 B1 | * 11/2002 | Wirth et al. ................. | 345/784 |

OTHER PUBLICATIONS

Ann Fatton et al.; "The Paper Model for Computer–Based Writing", Proceedings of ACM INTERCHI '93 Conference on Human Factors in Computing Systems, 1993, p. 514.

Beard et al.; "Navigational Techniques to Improve the Display of Large Two–Dimensional Spaces", Behavior and Information Technology, 1990 v. 9, n. 6, pp. 451–466.

Arai et al.; "Window System with Leafing Through Mode: Book Window", Proceedings of ACM CHI '92 Conference on Human Factors in Computing Systems, 1992, pp. 291–292.

Okada et al.; "Scrolling or Leafing Through: Book Window", First Moscow International HCI '91 Workshop Proceedings, 1991, pp. 242–248.

V. Kaptelinin; "A Comparison of Four Navigation Techniques in a 2D Browsing Task", Proceedings of ACM CHI '95 Conference of Human Factors in Computing Systems, 1995, v. 2, pp. 282–283.

* cited by examiner

Primary Examiner—Kristine Kincaid
Assistant Examiner—Mylinh Tran
(74) Attorney, Agent, or Firm—Fish & Richardson P.C.

(57) ABSTRACT

A computer implemented method of facilitating a user's viewing of content on a display monitor is described. The method includes displaying a first portion of a body of content. The method further includes receiving a request to display a second portion of content that at least partially differs from the first content portion. A visual indication is displayed in a content display area to distinguish the first and second content portions.

77 Claims, 19 Drawing Sheets

FACILITATING CONTENT VIEWING DURING NAVIGATION

TECHNICAL FIELD

This invention relates to facilitating a user's ability to view content on a display monitor, e.g., while the user is navigating through an electronic document.

BACKGROUND

The term "content" encompasses a wide variety of information including text, images, web pages, multimedia presentation, virtual worlds, interactive sessions, or any combination thereof. Computers are widely used to display and manipulate such content.

The essential elements of a computer are a processor for executing instructions and a memory. FIG. 1 shows one type of computer, a programmable processing system (system) 101. The system 101 includes a processor 102, a random access memory (RAM) 103, a program memory 104 (for example, a writable read-only memory (ROM) such as a flash ROM), and an input/output (I/O) controller 105 coupled by a processor (CPU) bus 106. The system 101 can be preprogrammed, in ROM, for example, or it can be programmed (and reprogrammed) by loading a program from another source (for example, from a floppy disk, a CD-ROM, or from another computer via a communication link). A computer generally also can receive programs and data from a storage medium such as an internal disk (not shown) or a removable disk 107.

The I/O controller 105 is coupled by means of an I/O bus 108 to an I/O interface 109. The I/O interface 109 receives and transmits data (e.g., stills, pictures, movies, and animations for importing into a composition) in analog or digital form over communication links (not shown) such as a serial link, local area network, wireless link, and parallel link. The I/O interface 109 also may be connected to a removable disk drive 111 for reading and writing data to/from removable disk 107. Also coupled to the I/O bus 106 are a display 112 and a keyboard 113. Alternatively, separate connections (separate buses) can be used for the I/O interface 109, display 112 and keyboard 113.

As shown in FIG. 2, a user of a computer system can access content either stored locally at the user's own client system 202 (for example, a personal or laptop computer) or remotely (using a modem 204 and a telephone line 206 or, alternatively, using TCP/IP over a direct communications link 207) at one or more server systems 200. An example of a server system is a host computer that provides subscribers with online computer services such as e-mail, e-commerce, chat rooms, Internet access, electronic newspapers and magazines, etc. Users of a host computer's online services typically communicate with one or more central servers systems 200 through client software executing on their respective client systems 202.

Content, whether locally or remotely stored, is typically accessed using an application program specially designed to process a particular type of content. These applications typically allow the user to manipulate the content, including the capability to display, edit, or both. Applications used primarily to view content include "browsers," "readers," and "viewers." Some applications have the ability to process many different types of content simultaneously, while others have the ability to use "plug-in" or "helper" applications allowing the user to add support for additional content types. Microsoft's Internet Explorer is an example of a browser application that displays many different types of content and supports plug-ins. FIG. 3 shows a screenshot of a web page 301 displayed by the Internet Explorer browser.

Many computer systems provide a graphical user interface (GUI) that includes windows to allow applications to display portions of content. Multiple windows can be displayed on a display monitor at any time. FIG. 4 shows a typical windowed GUI 401 with two windows 402 currently displayed. Each window 402 is a separate viewing area on the computer display screen in a system that allows multiple viewing areas. Windows are managed by a windows manager that allows windows to be stretched on any side, minimized, maximized, and closed using graphical controls 404.

Frequently, a body of content (for example, a word processing document or an image file) may be too large to display in its entirety on a display monitor at a usable size. Other times, the display monitor may be physically large enough to display all of the content at once, but a user has chosen to display the content in a magnified state or in a window that is only a fraction of the size of the display monitor. In both cases, application programs typically display only a portion, or subset, of the content and allow the user to navigate incrementally through the content one portion at a time. These content portions may overlap, so that a newly displayed portion contains some of the previously displayed portion. Or, the successively displayed portions may be disjoint, such that none of the old portion is displayed with the new portion. As used herein, an "old" content portion refers to a previously displayed portion of the content and a "new" content portion corresponds to a subsequently displayed portion of the content.

Windowed GUI environments ordinarily handle the processing involved with displaying only a portion of the underlying content. In non-windowed environments, applications must provide their own means for displaying portions of their content. For example, text-terminal based programs, such as the "less" and "more" text viewers provided with Unix operating systems, can be used to display text documents a single page at a time.

In order to allow users to navigate through the content, applications provide a variety of techniques to enable users to indicate which new portion of content to display. For example, in a typical word processing context, the application, in response to user input, can "scroll" the document by showing the old content portion moving off the page in a smooth, continuous motion as a new adjacent content portion moves onto the page. Another method of displaying new portions of content is by using "paging." In this case, the application simply jumps to and displays the new portion of content, replacing the old portion on the display monitor without any intermediate display states. Scrolling and paging can occur in any direction, but typically involve moving to a portion of content in a horizontal or vertical direction to display a new portion of content.

Several navigation mechanisms involve the use of the keyboard. For example, the arrow keys typically indicate that the application should display a portion of content overlapping the currently displayed portion of content and located in the direction indicated by the particular arrow selected. Similarly, the "Page Up" and "Page Down" keys indicate that the application should display a portion of content adjacent to the current portion and located in the indicated direction (i.e., up or down).

Other navigation mechanisms are graphical in nature. Known as "widgets," these mechanisms are user interface controls that can be manipulated by the user, typically using a cursor controlled by a mouse or touchpad. A widget is an element of a graphical user interface (GUI) that displays information or provides a specific way for a user to interact with the operating system and application programs. Widgets include icons, pull-down menus, buttons, selection boxes, progress indicators, on-off checkboxes, scrollbars, windows, window edges (for resizing the window), toggle buttons, forms, and many other devices for displaying information and for inviting, accepting, and responding to user actions.

In a graphical user interface environment, different ways exist to select a portion of content to be displayed by an application. For example, a scrollbar is a graphical widget that can be used to navigate in a single dimension through content, typically in the vertical or horizontal dimension. FIG. 5 shows a typical vertical scrollbar 501 attached to a window 502 with text content 503. The current portion of text displayed is represented by "bubble" or "thumb" 504. The location of the thumb relative to the entire scrollbar is proportional to the location of the visible portion of content relative to the entire body of content. The height $H_T$ of the thumb 504 represents a graphical indication of the amount of content that is visible relative to the entire body of content, which is graphically represented by the height $H_C$ of the entire scrollbar 501. To navigate to a different portion of text, the user can select the thumb 504 with the cursor and drag it up or down. In addition, the arrows 505 can be used to move a short distance, such as one line, up or down. Clicking in the scrollbar 501 above or below the thumb 504 typically causes the window to display a new page full of content, either above or below the current location.

Another technique for graphical navigation is "direct manipulation" by using a cursor (typically an open hand symbol) to select a first location within the content, dragging that location to another position on the screen, and displaying the new portion of content made visible by the repositioning. A similar approach frequently is used to navigate in electronic mapping applications where the user selects a point on the map as the new "center" and the application displays the portion of content surrounding that new center point.

Commands, whether selected from a menu or entered using a keyboard, also may be used to navigate through a document. For example, the "find" command available in many word processing applications makes it possible for a user to navigate through a document by viewing the content portions surrounding occurrences of a specified text string. Other commands may allow users to navigate in other ways. Commands also may be invoked by the user through the use of keystrokes, menus, graphical widgets, macros, or a command line.

FIG. 6 shows a content window 601 displayed by Adobe Acrobat Reader, a portable document format (PDF) reader application. In a previous state (not shown), a portion of text 602 from the middle of a text document had been displayed. The user then selected the "Page Down" key on the keyboard, and a new portion of text 603 immediately following the old portion 602 was displayed, as shown in FIG. 6 such that at least part of the old and new portions overlap. Because the new portion of text overlaps the old portion, the user is presented with the problem of finding the point 604 to commence reading following the change of view (i.e., where the new text begins and the old text ends). This problem occurs whenever a user scrolls or pages content and the new content to be displayed includes some of the old content.

Generally, Acrobat Reader and other applications display the last line of text 605 of the old portion of text at the top of the new portion. This approach has been used in many applications, including the Unix applications "less" and "more." However, the various implementations often are inconsistent with each other regarding the amount of the first portion to display with the second portion, thereby forcing users to search for the boundary of the new content. Moreover, depending on factors such as window size, document size and current viewing position, it may not be feasible to display the last line of the old portion at the top of the new portion.

The present inventors recognized that it would be advantageous to allow users to quickly differentiate between old and new portions of content when the user navigates through content or whenever the viewing position otherwise changes. Consequently, the present inventors developed a new technique that allows applications to use a visual indication within the content display to differentiate between the old and new content.

SUMMARY

In general, in one aspect, a computer-implemented method of facilitating a user's viewing of content on a display monitor includes displaying a first portion of a body of content, and receiving a request to display a second portion of content. The second portion of content at least partially differs from the first content portion. The method includes displaying the second content portion including a visual indication within or adjacent to the displayed content distinguishing the first and second content portions.

Implementations of the computer-implemented method may include various combinations of the following features. The body of content may include text displayed by a word processor, or text displayed by a document viewer. Alternatively or in addition, the body of content may include graphic images displayed by a graphics editor or viewer, or multimedia content. The body of content may include an electronic document. The electronic document may include a portable document format (PDF) file. Furthermore, the body of content may be stored locally at the user's own client system, or stored remotely at one or more server systems.

The request may include a command from a user input device, or a command from a graphical widget displayed in a graphical user interface. The graphical user interface may facilitate user interaction with an operating system and application programs. The graphical widget may include one or more of icons, pull-down menus, buttons, selection boxes, progress indicators, on-off checkboxes, scrollbars, windows, window edges, toggle buttons, and forms. The graphical widget may include an element that displays information and invites, accepts, and responds to user actions. The command may cause a scrolling operation to occur in one or more directions.

The request may include a direct manipulation using a cursor to select content and drag content across the display. The request may include a command from a software tool that may be selected from a menu or entered using a keyboard. Likewise, the request may include a command that causes a resizing operation of a window containing the content.

The second portion of content may partially overlap the first content portion. Or, the second portion of content may be disjoint and adjacent or separated from the first content portion. The second portion of content may be offset from the first content portion in a vertical direction, a horizontal direction, or a combination of both directions.

The visual indication may include an artifact displayed on or adjacent to the content. The artifact indicates a boundary between the first portion of content and the second portion of content. The artifact may include a cursor, a bookmark, an arrow, a line, or any combination thereof. The artifact may alternatively include a graphical icon or text. The artifact may indicate a direction of the second portion of content to the first portion of content, or a distance from the second to the first portion of content.

The artifact may take a predetermined or user-specified action. For example, the action taken by the artifact may return the user to the first portion of content. The artifact may include an animation that conveys information about the artifact. The characteristics of the artifact may be changeable by the user. Such characteristics may include an artifact's size, shape, brightness, and hue.

The visual indication may include a modification of a background associated with the first portion of content, the second portion of content, or both portions of content. The background modification may include a modification of tint of the background. The background modification may include altering a brightness, hue, pattern, or any combination thereof of the background. The background of the first portion of content may be altered in a different manner from the background of the second portion of content.

The visual indication may include a modification to a foreground of the first portion of content, the second portion of content, or both portions of content. The foreground modification may include an alteration in brightness, hue pattern, font characteristics, graphics characteristics, or any combination thereof.

The visual indication may distinguish one or more boundaries of the first content portion. Moreover, the visual indication may distinguish a direction or a distance of the first content portion relative to the second content portion.

The second portion of content may include a modification of the body of content. The modification of the body of content may include a cut-and-paste operation, an alteration of the appearance of the content or of the window in which the content is displayed, or an addition or deletion of newly presented content to the body of content.

In general, in a second aspect, a computer-implemented method of facilitating a user's viewing of content on a display monitor includes displaying a first portion of a body of content. The method includes receiving a request to display a distinct second portion of the body of content simultaneously with at least part of the first portion of the body of content. In response to a request, the second portion, the part of the first portion, and an indication within or adjacent to the displayed content are displayed simultaneously. The indication visually distinguishes the second portion from the first portion and is supplemental to and not part of the content.

One or more of the following advantages may be provided. The systems and techniques described here may enable a user to read or edit a document on the screen more quickly and easily by providing continuity while the user scrolls, pages, or otherwise navigates through a body of content. Users can locate a particular content portion more quickly by being able to identify what content has already been displayed on the screen. As a result, interruptions to a user's train of thought are minimized.

The systems and techniques described here provide a robust visual indication that improves a user's ability to locate and comprehend desired portions of a body of content quickly and efficiently. The flexibility of the techniques encourages its application across a wide variety of applications and types of content. Further, application developers will find the technique simple to implement, thus reducing the likelihood of software application problems.

In addition, the systems and techniques described here will have benefits for content navigation involving more than a single user. Viewers who are not controlling the navigation will be able to identify the direction and magnitude of each move through a body of content even though they do not know what commands and controls might have been used. For example, multiple users engaged in a single browsing session over a network, such as a local area network within an office or the Internet, may be viewing a body of content together, with a single user controlling the navigation. In this case, the techniques described here will provide the non-controlling users with information that will help them locate their position in a body of content. For example, if the controller scrolls the document down, the other users will be able to see that the previously viewed content moved to the top of the screen and is shaded, and that the new content is not shaded.

Moreover, the systems and techniques described here provide the user with immediate feedback indicating what percentage of the screen changes when a scroll operation occurs. For example, if the user scrolls using a mechanism such as a mouse click on a control icon, and each time the user clicks on the control icon, the screen changes by, for example, a quarter, this provides the user with information about that control icon. Therefore, the user can predict how much of the screen will scroll when that control icon is clicked, in this example, a quarter of the screen scrolls.

The details of one or more embodiments are set forth in the accompanying drawings and the description below. Other features, objects, and advantages of the invention will become apparent from the description and drawings, and from the claims.

DRAWING DESCRIPTIONS

FIGS. 10A, 10B, 10C, and 10D show the use of an artifact to indicate old and new content.

Figure 11A:
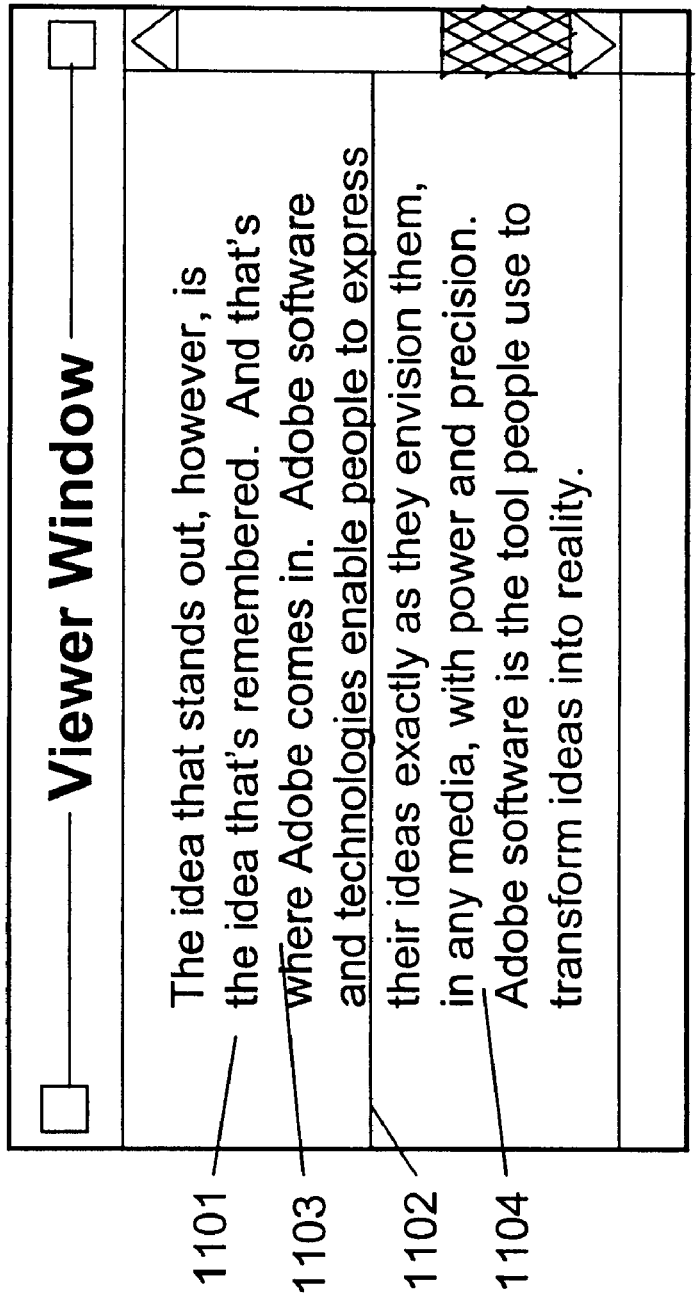
Figure 11B:
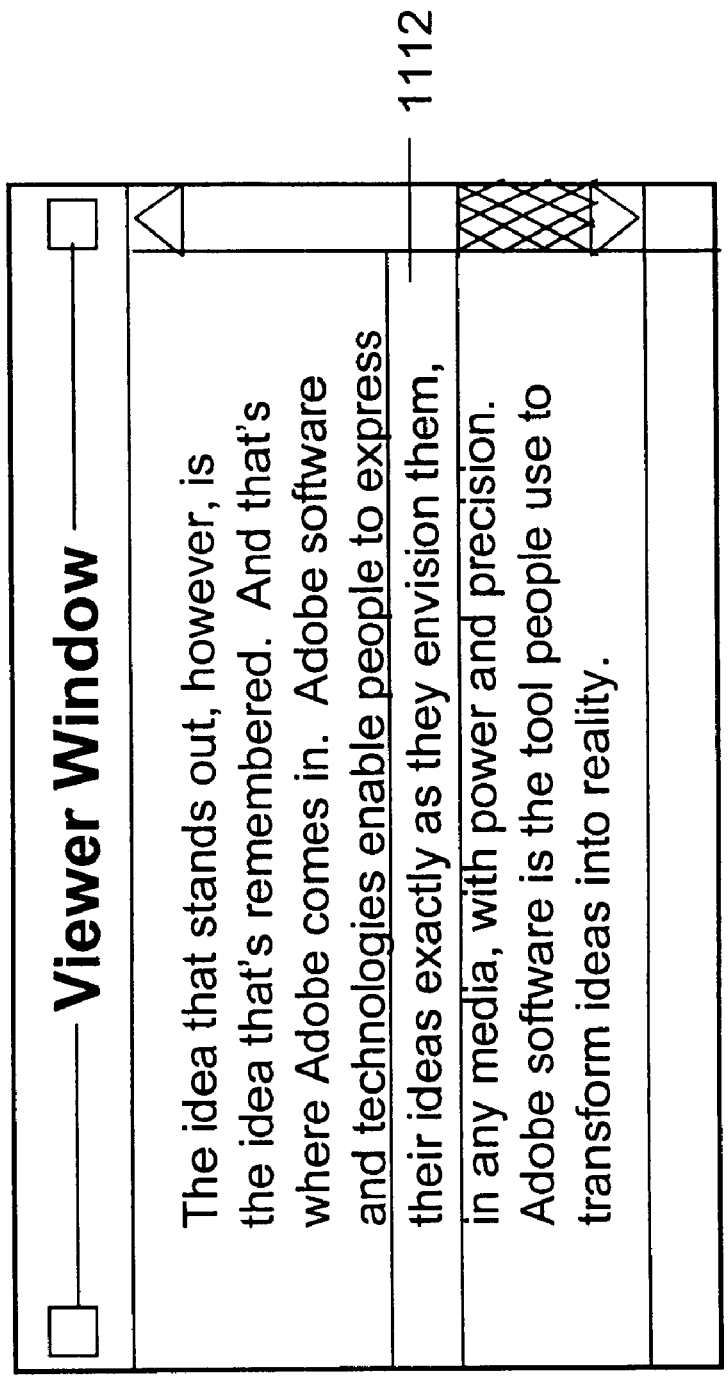

FIGS. 11A and 11B show modifying content background to indicate old and new content.

Figure 12A:
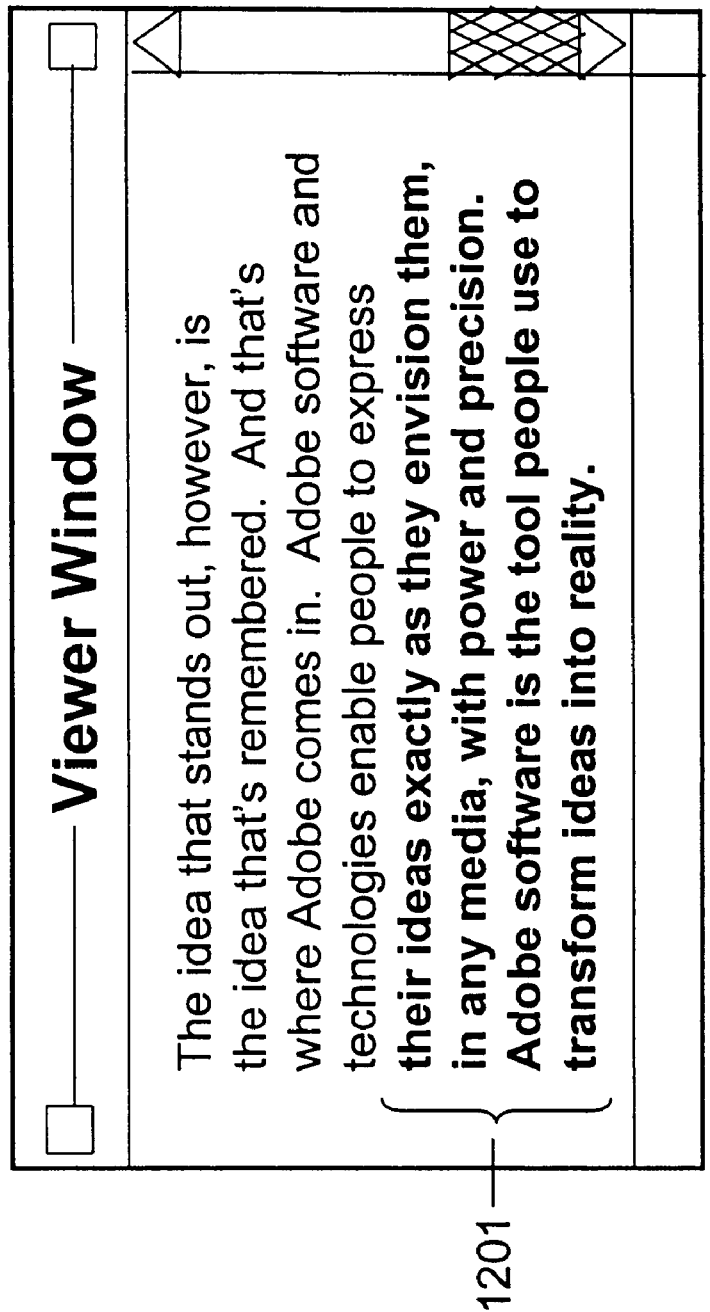
Figure 12B:
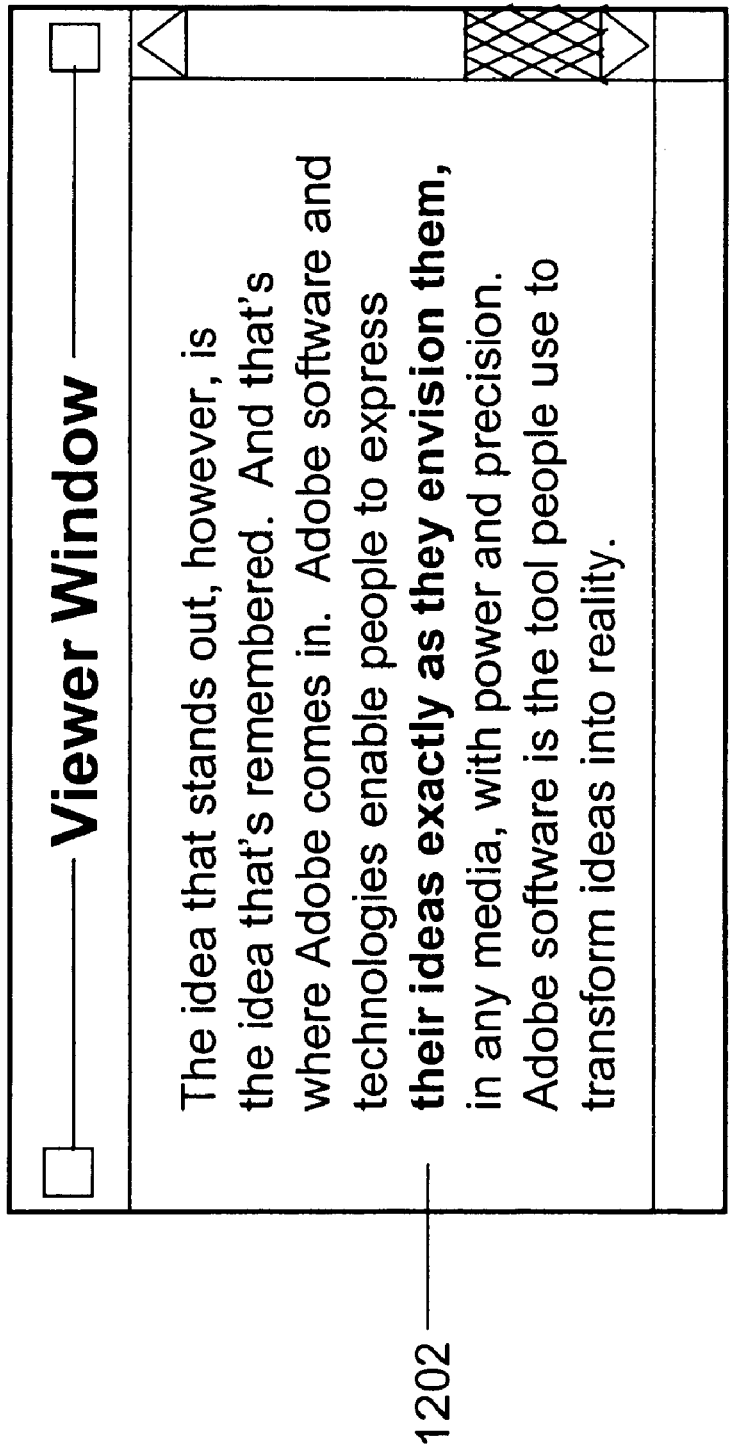

FIGS. 12A and 12B show modifying the content itself to indicate old and new content.

Figure 13A:
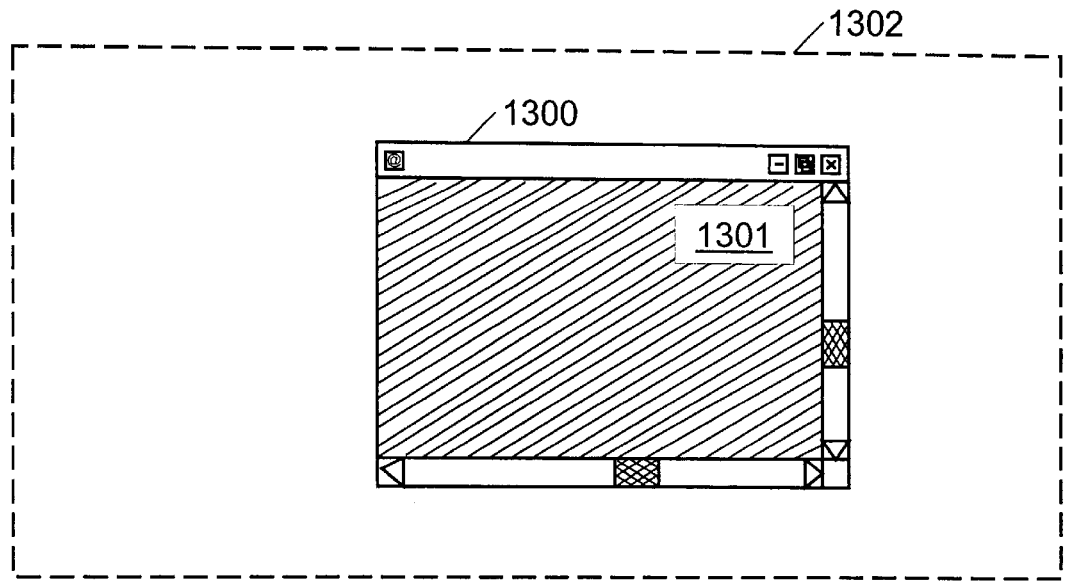
Figure 13B:
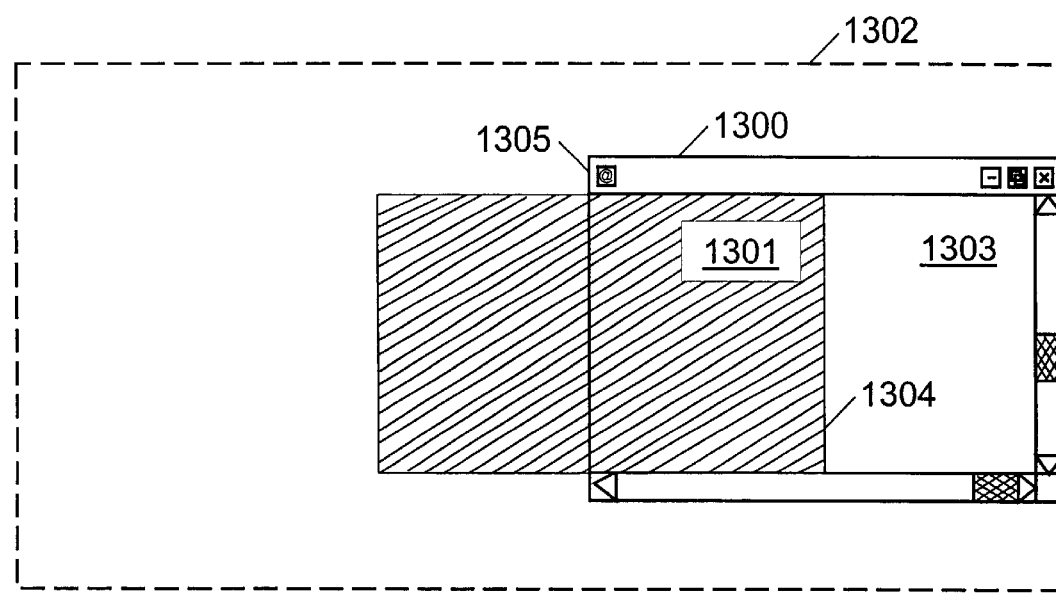

FIGS. 13A and 13B show the effects of scrolling near edges.

Figure 14:
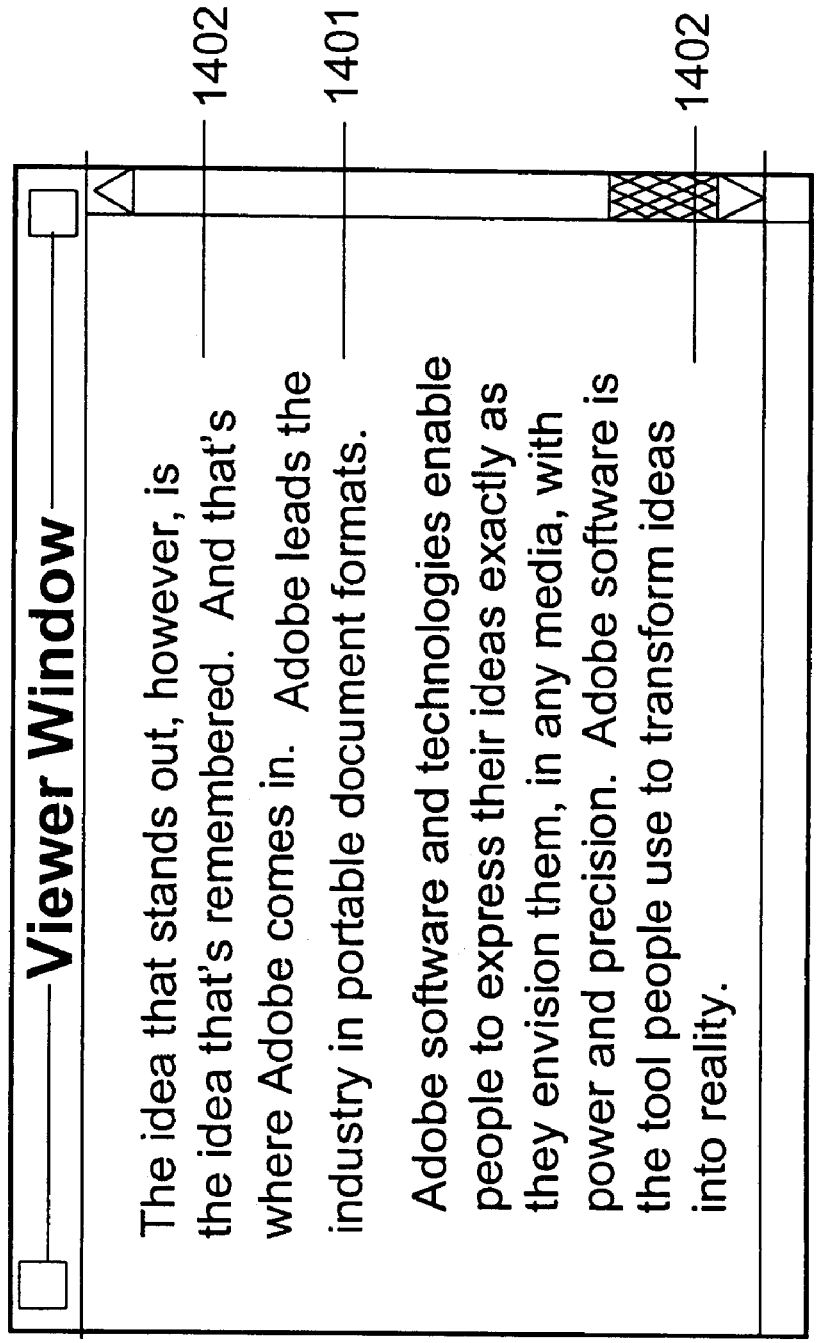

FIG. 14 shows a cut-and-paste insertion example.

Like reference numbers and designations in the various drawings indicate like elements.

DETAILED DESCRIPTION

The techniques described here allow applications to use a visual indication within the displayed content to differentiate between previously viewed content and newly presented content. In general, a visual indication is added to a displayed content portion to delineate which part of the displayed content was visible to the user in a previous view and/or which part of the displayed content is newly visible to the user.

Figure 1:
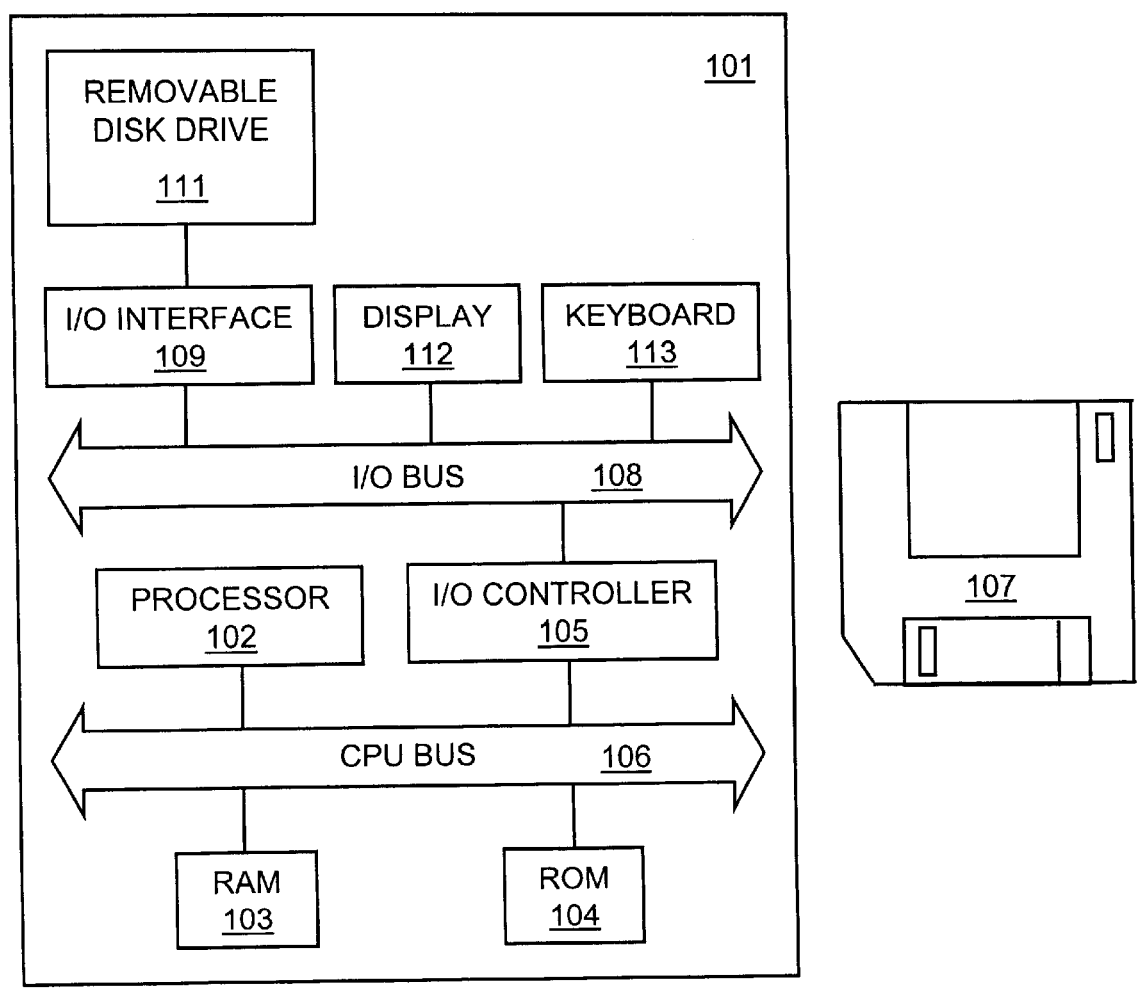
FIG. 1 is a block diagram showing a typical computer architecture.
Figure 2:
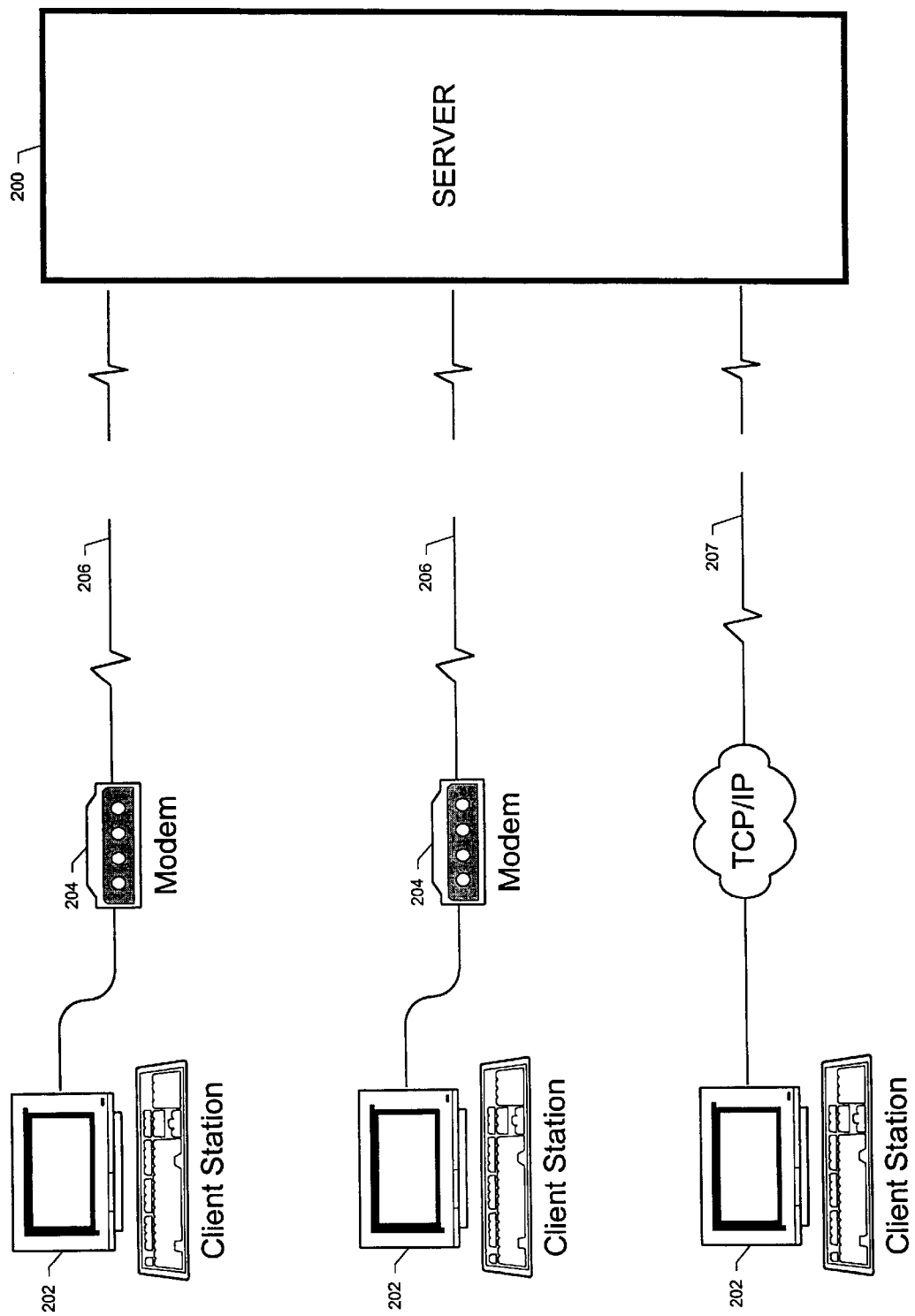
FIG. 2 shows a conventional network-computing environment.
Figure 3:
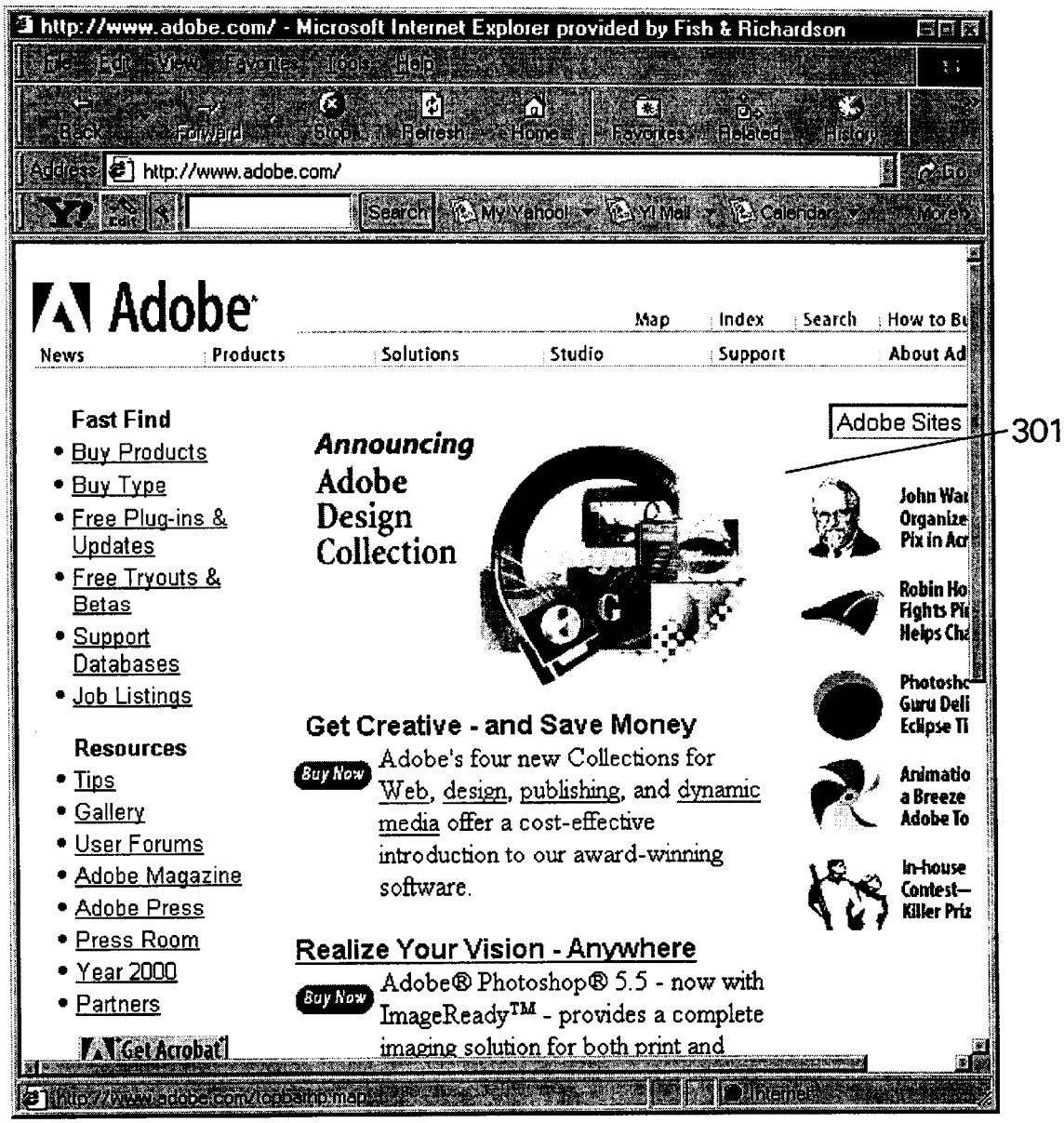
FIG. 3 shows a screenshot of a web page.
Figure 4:
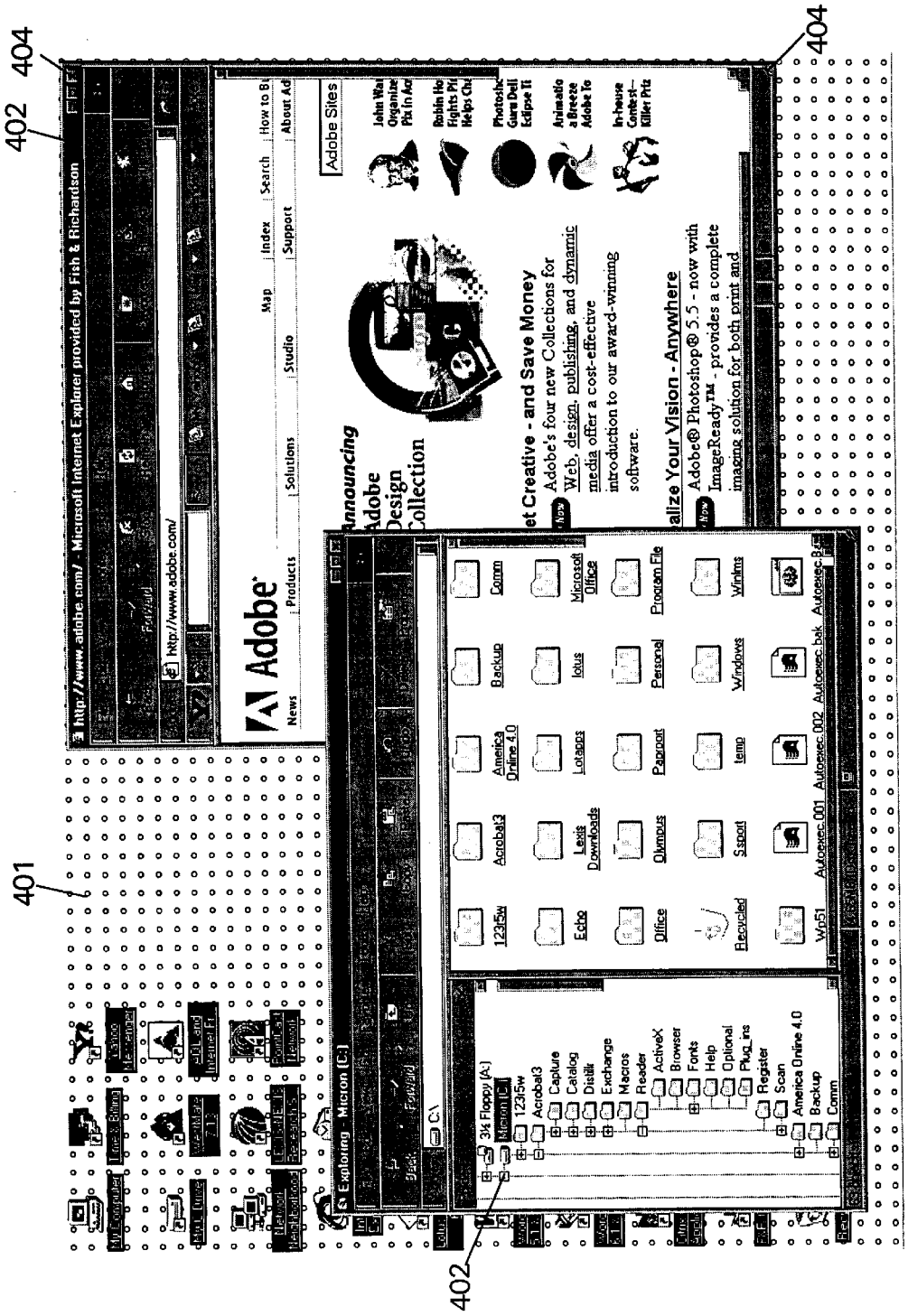
FIG. 4 shows a screenshot of a windowed graphical user interface.
Figure 5:
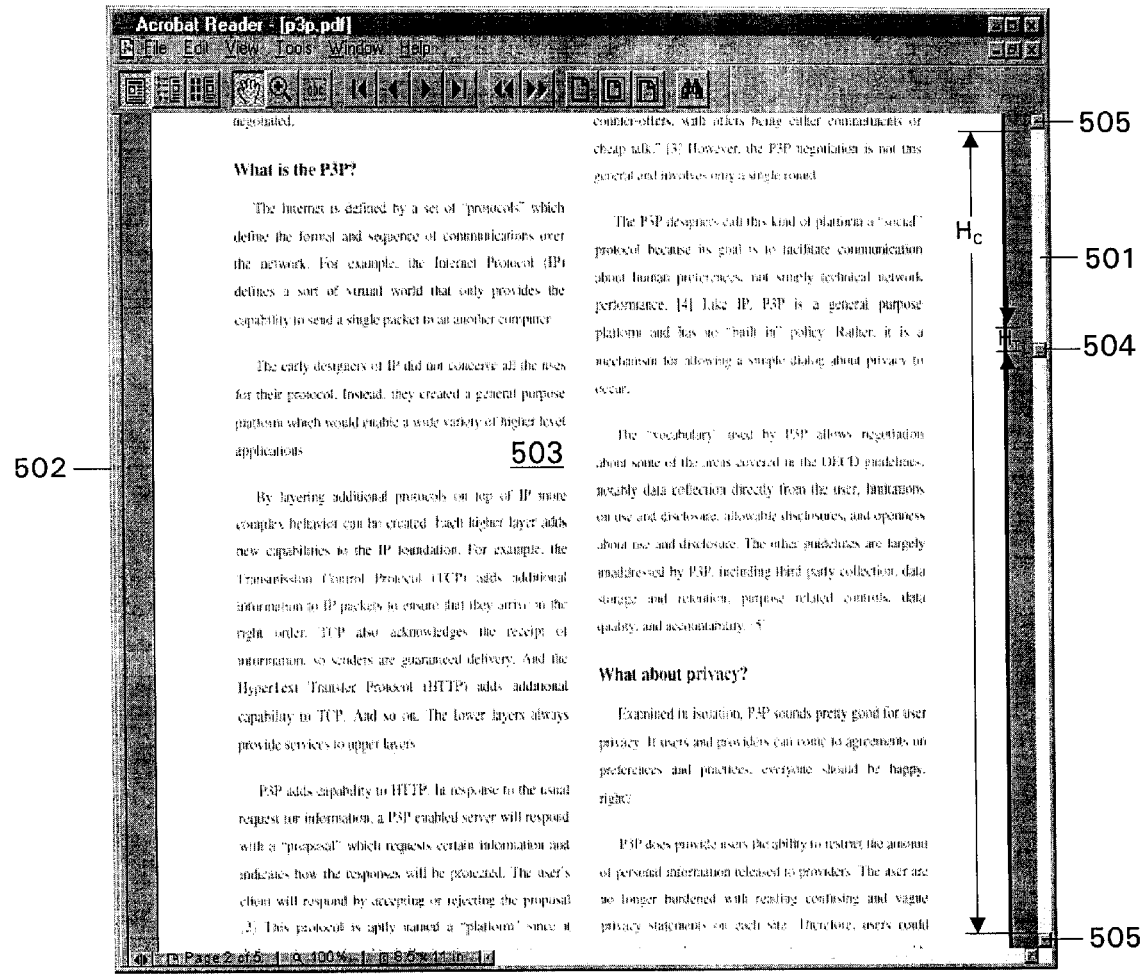
FIG. 5 is a diagram of a vertical scrollbar.
Figure 6:
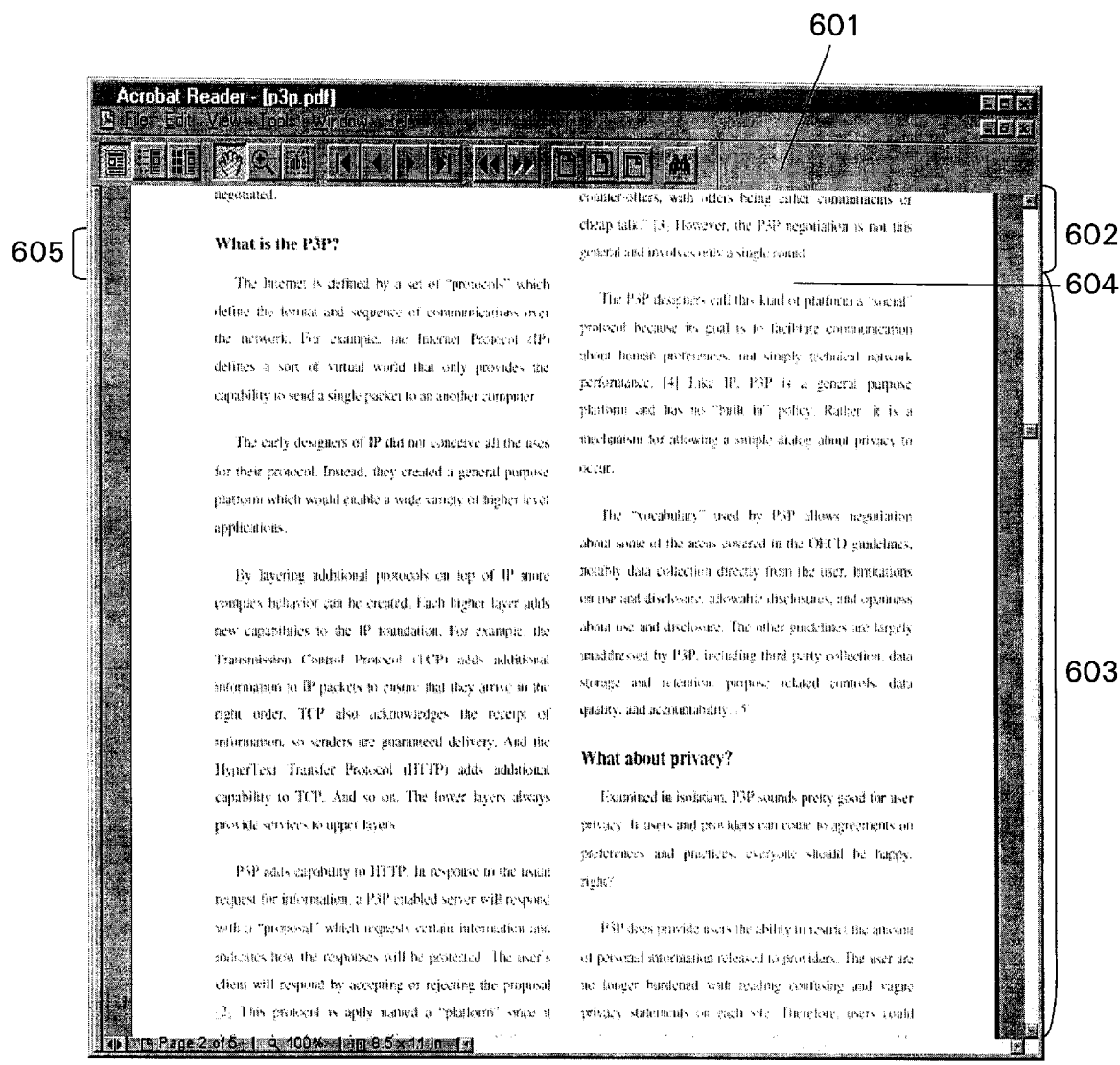
FIG. 6 is a screenshot of an Adobe Acrobat Reader window.
Figure 7:
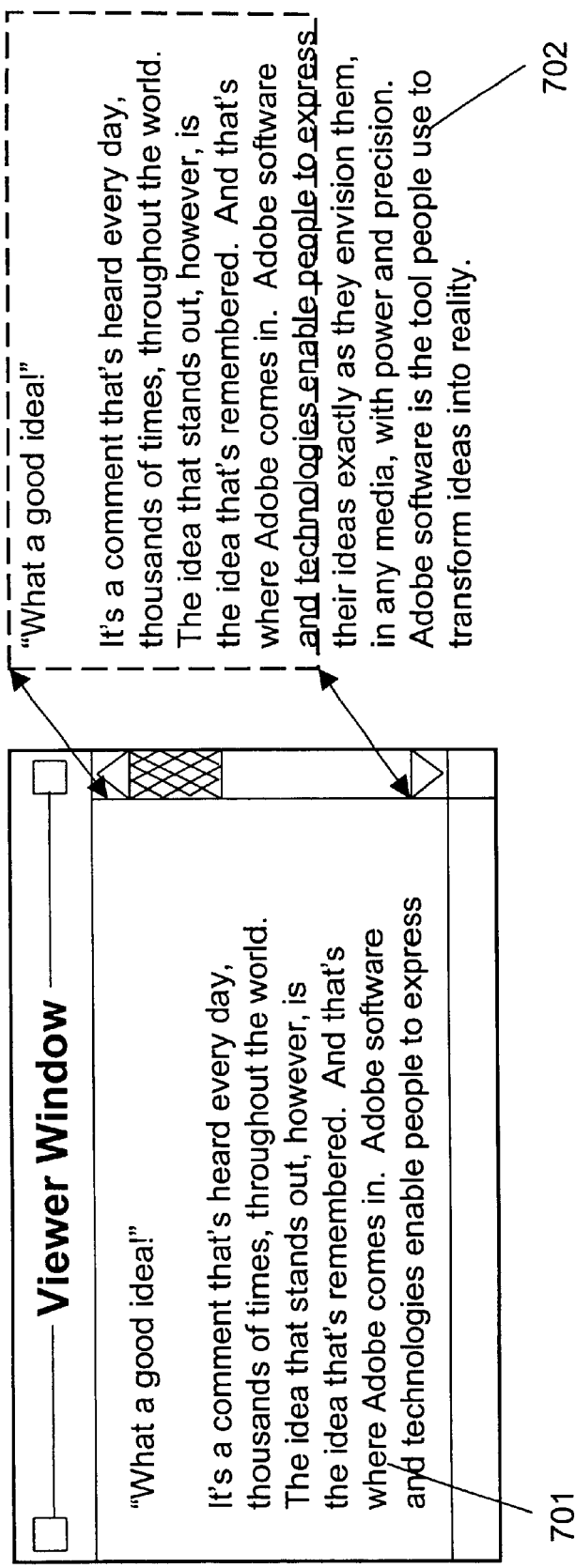
FIG. 7 shows a typical content window displaying text.
Figure 8:
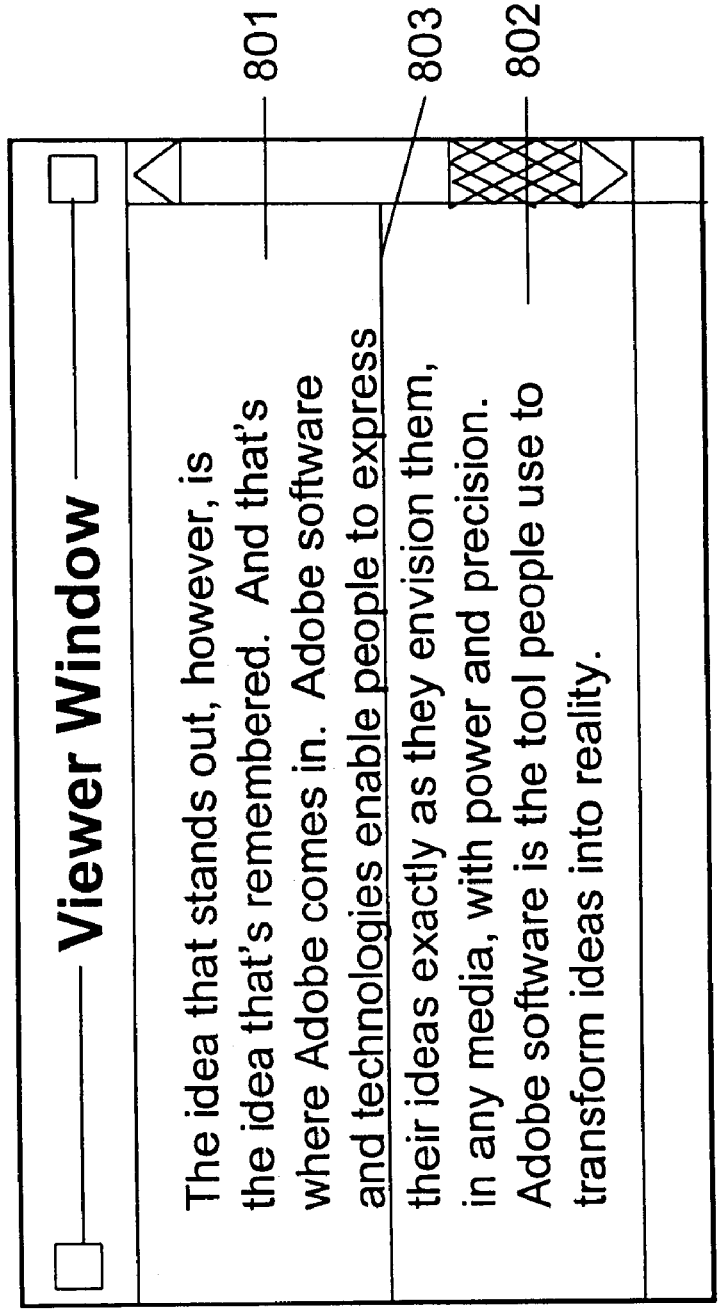
FIG. 8 shows a tinting method of indicating old content.

FIGS. 7 and 8 are "before" and "after" views illustrating an example of one implementation of such a visual indication technique. In FIG. 7, a window contains a portion, or subset, 701 of a larger body of content 702, a text document in this case. FIG. 8 shows how the window would appear after the user has directed the application to scroll down by four lines. The background of the previously viewed content 801 is tinted a darker shade than the background of the new content 802. The boundary between the previously viewed and new content 803 is clearly defined and easy for the user to locate.

Figure 9:
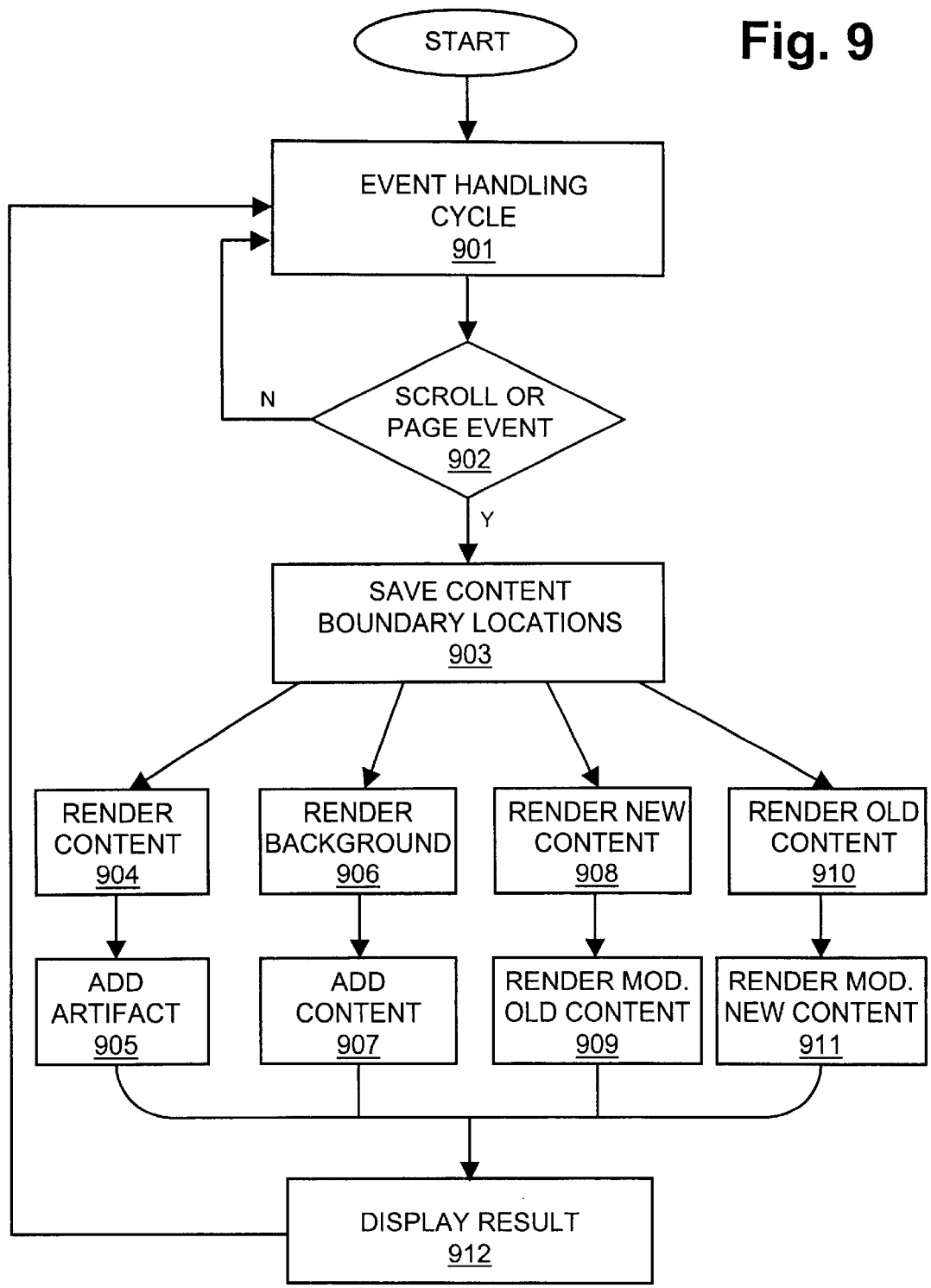
FIG. 9 is a flowchart showing a technique for indicating old and new content.

There are three primary approaches to differentiating between the previously viewed and newly presented content. First, the application can add or modify an artifact in the display to indicate the boundary. For example, a line or a marker at the point can be inserted where the new content begins or next to the content. Second, the background of the previously viewed or newly presented content could be modified. Third, the content itself, or foreground, could be modified. Examples of possible implementations are described below. In addition, various combinations of these three approaches are possible. FIG. 9, for example, shows a combination of approach one (artifact added) and approach two (background modified).

FIG. 9 is a flowchart showing steps that an application can follow to provide visual differentiation between previously viewed and newly presented content. The first stage 901 is part of the application's normal event handling cycle, where the application waits for input from the user and handles other maintenance tasks. Whenever the application receives an event from the user via a graphical widget, keystroke, or a command, that event is handled by an appropriate subroutine. If the event is an instruction to scroll or page the content 902, the application begins the process of updating the screen to reflect the results of the operation.

Before performing the scroll or page operation, the application saves the boundary locations of the content currently displayed 903 in order to remember what has already been shown to the user. This information can be stored in a variety of ways, including using pointers to the first and last characters displayed, as coordinates of two opposite corners of the displayed content, or as coordinates of the sides of the displayed content.

The following sequence of steps accomplishes the scroll or page operation by rendering the indicated portion of content to the screen, including both any visual indicators, the visible part of the previously viewed content, and the newly presented content. The order of these steps may be rearranged as desired for performance or efficiency reasons. If the differentiation method is to add or modify an attribute, then the application renders the content 904 and adds or modifies the artifact 905. If the differentiation method is to modify the background, then the application makes the background modification 906 and then renders the content 907. Further, if the differentiation method is to modify the foreground of the previously viewed content, then the application renders the newly presented content 908 and then renders the previously viewed content with the selected modification 909. Similarly, if the differentiation method is to modify the foreground of the newly presented content, then the application renders the previously viewed content 910 and then renders the newly presented content with the selected modification 911. The application then can display the result to the user 912. Once the scroll or page operation is complete, the application can return to its event handling cycle 901.

As mentioned above, three available ways to differentiate between previously viewed and newly presented content are using an artifact, modifying background, modifying foreground, or any combination of these. Each of these alternatives can be implemented in a variety of ways, as discussed below.

Figure 10A:
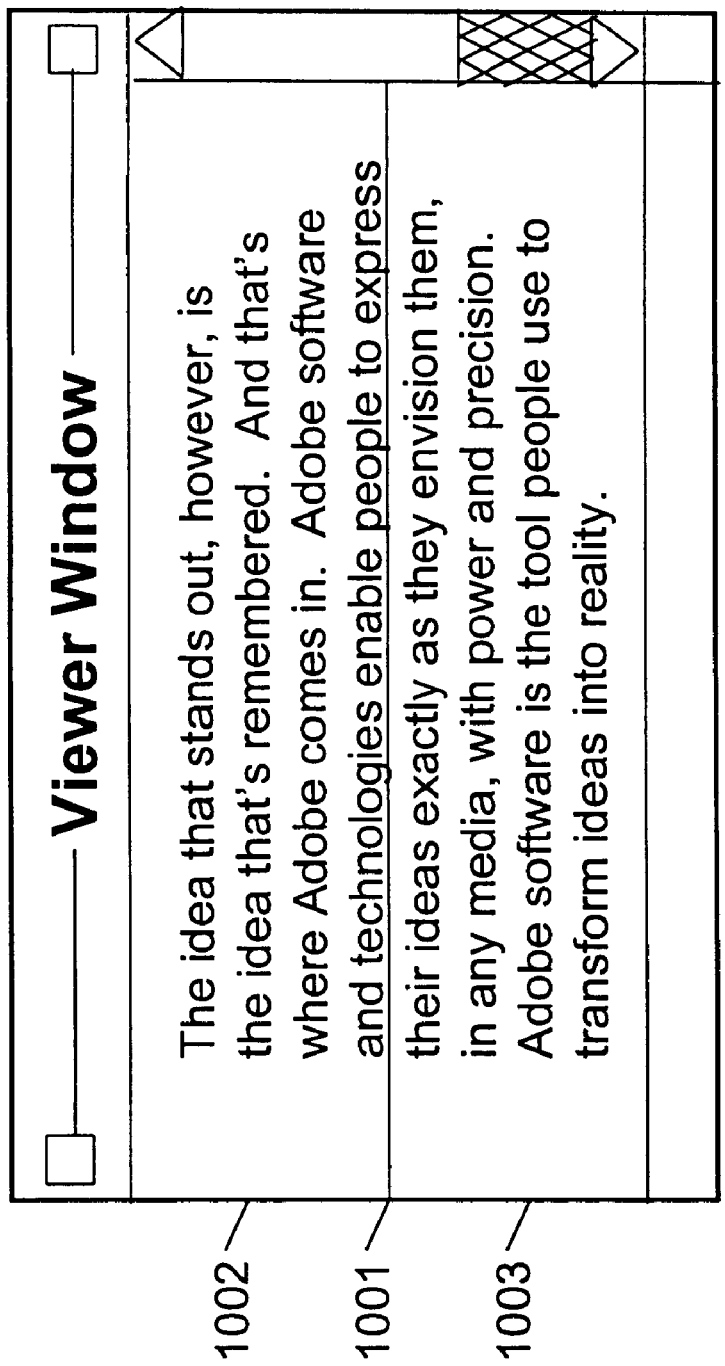

Artifacts can be used in many different ways to differentiate between previously viewed and newly presented content. As used herein, an artifact is any visible indicator inserted into or adjacent to the displayed content by the application program that is not part of the background or foreground of the content. Artifacts can be any graphical symbol, text style, text, or a combination of graphical symbols, text styles, and text. FIG. 10A shows one example, the use of a hairline after a scroll or page operation. In FIG. 10A, the hairline 1001 separates the previously displayed content 1002 from the newly presented content 1003. The hairline allows users to quickly find their place in the text. The same technique can be used with graphical or multimedia content. If the user scrolls or pages in a horizontal direction, the hairline can be placed vertically at the boundary between the previously viewed and newly presented content. If the user scrolls or pages in both the horizontal and vertical directions at the same time, a right-angle hairline can be drawn around the border of the previously viewed content. Such an artifact would be useful for a reader viewing content that originates from a language or culture not entirely familiar to the reader. For example, if the content corresponds to a language that is read left-to-right and top-to-bottom (e.g., English), and the reader is familiar with and accustomed to reading a language with a different flow pattern (e.g., right-to-left or bottom-to-top), the artifact could help the reader to navigate the unfamiliar flow pattern of the displayed content.

Figure 10B:
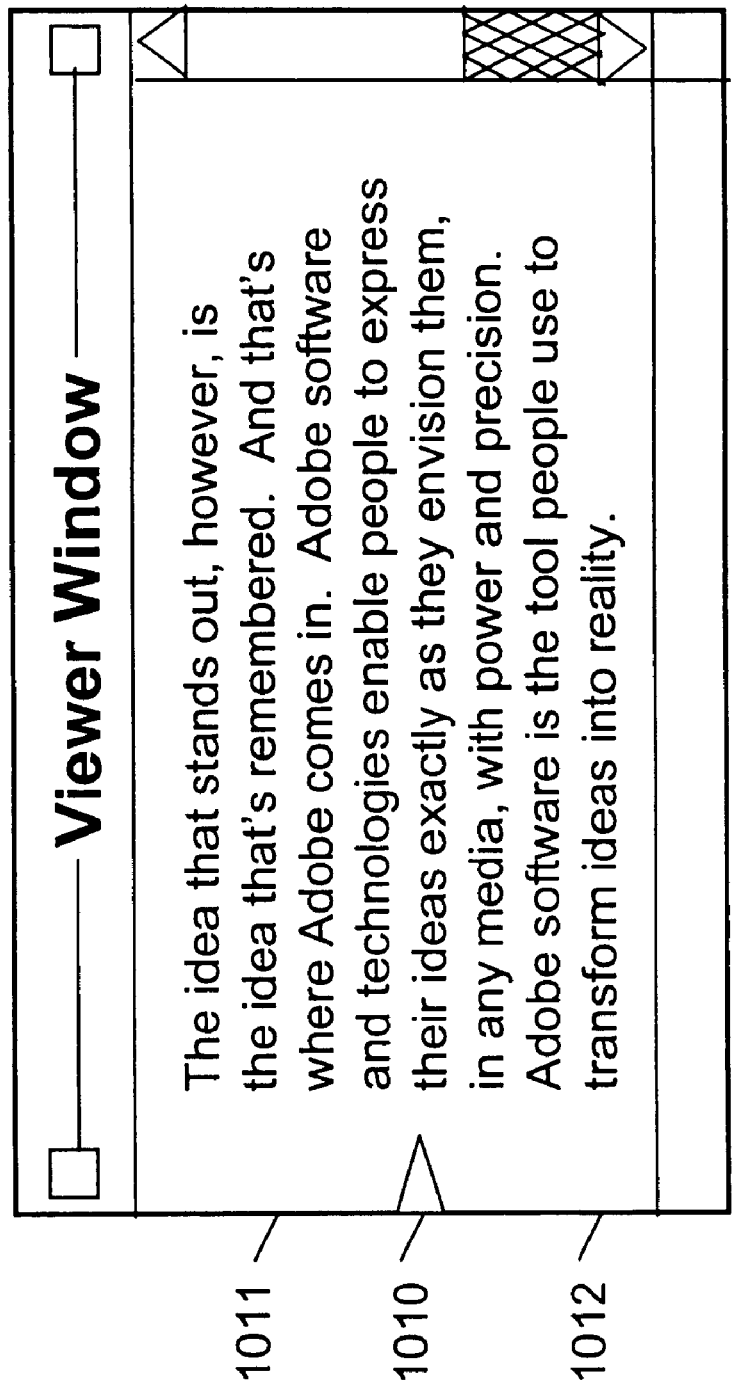
Figure 10C:
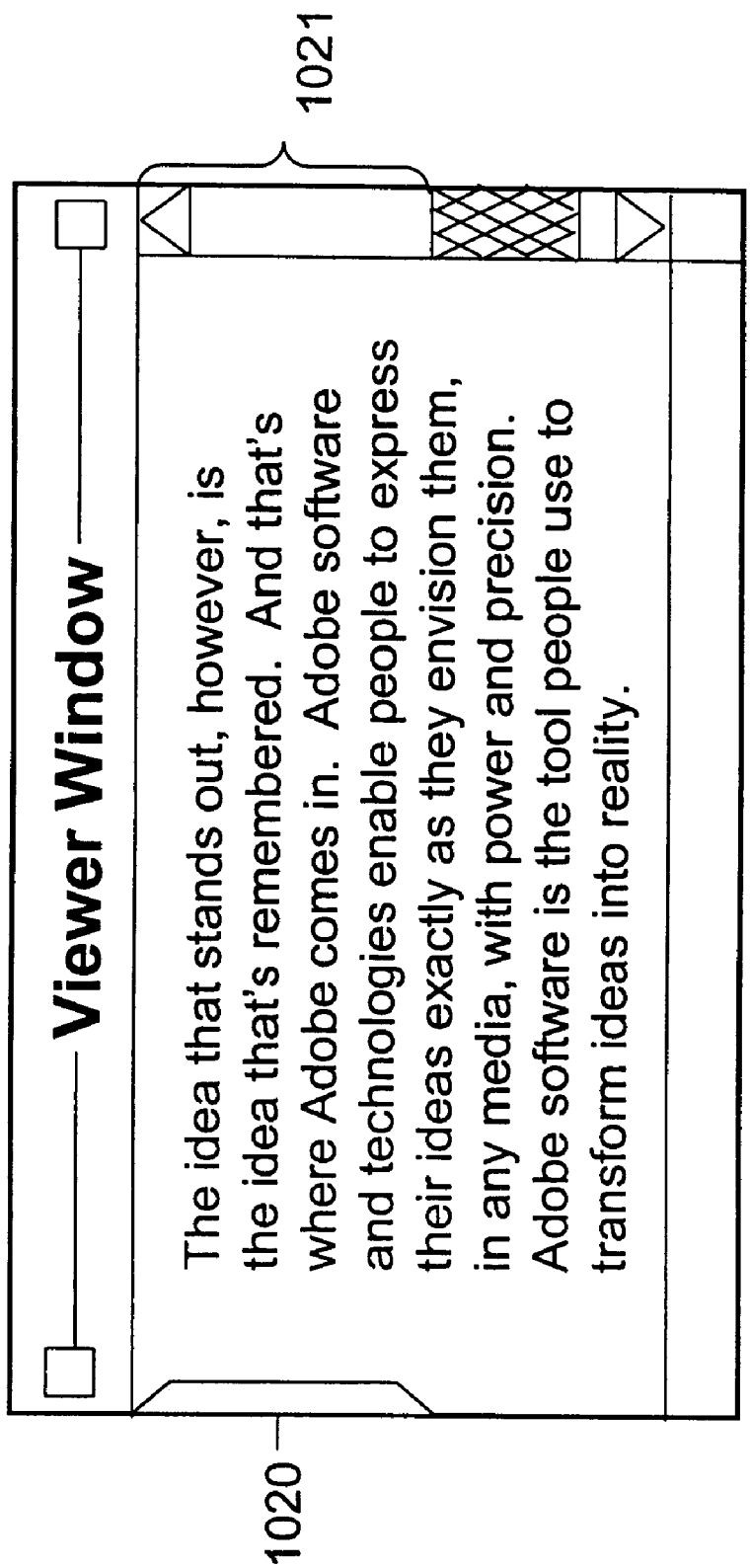
Figure 10D:
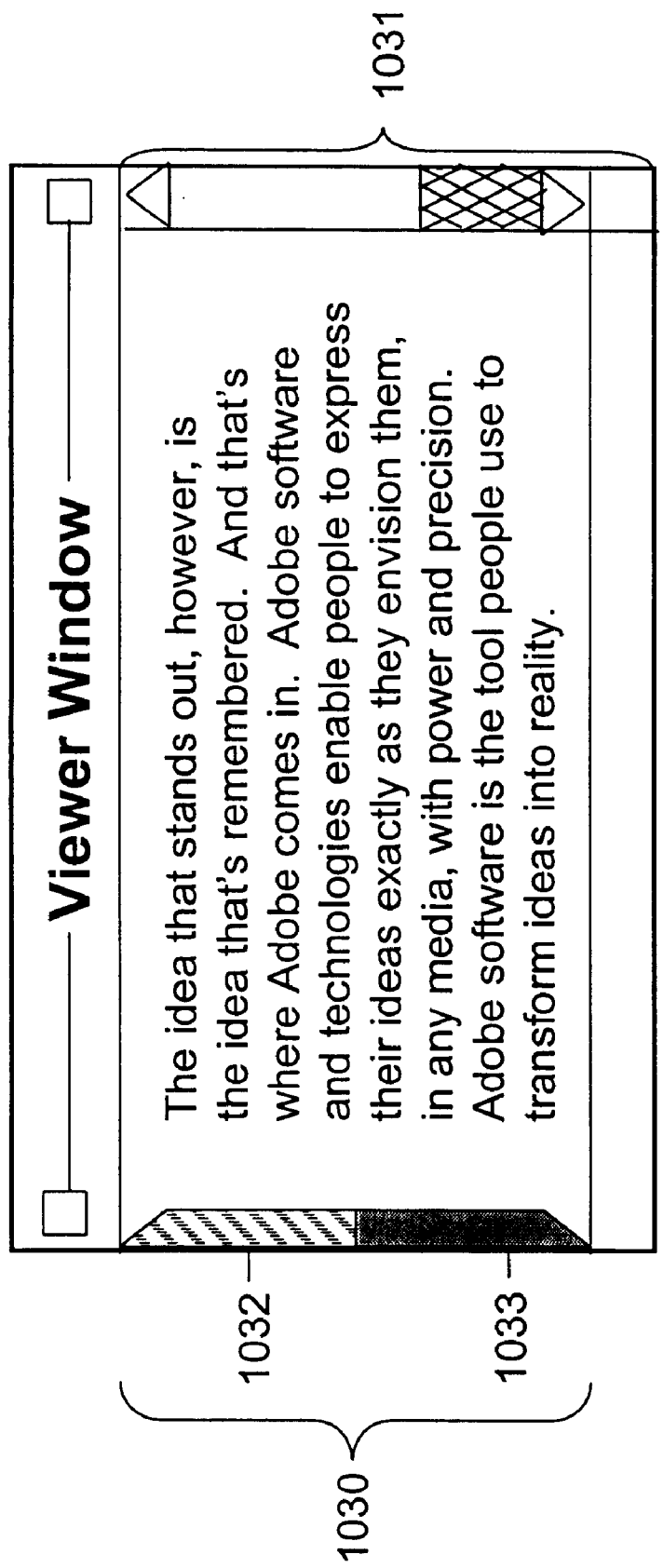

Other artifacts can be used. For example, FIG. 10B shows the use of a triangular icon 1010 on the left edge of the boundary between the previously viewed content 1011 and newly presented content 1012. This icon could take many shapes or sizes. FIG. 10C shows an elongated trapezoid 1020 that spans the height of the previously viewed content 1021. FIG. 10D shows a similar example with an elongated trapezoid 1030 that spans the height of the entire window 1031 and has a lightly shaded portion 1032 above the boundary between the previously viewed and newly displayed content and a darker shaded portion 1033 below the boundary.

In most editor and viewer applications, the content being edited or viewed typically is displayed within a content display area, for example, an inner pane in a windows-based user interface around which items such as toolbars, scrollbars, status bars, menus, borders, other panes and the like may appear. In one implementation, the artifact or other visual indication that distinguishes between displayed content portions is displayed within the same content display area (e.g., inner pane) in which the content is displayed. For example, the artifact or other visual indication may be superimposed on top of the content, or the display of the content itself may be varied (e.g., changing foreground and/or background colors) to serve as the distinguishing visual indication.

When the user has scrolled or paged to a nonadjacent portion of the content (i.e., when no overlap or continuity exists between the old and new content portions), the artifact can be used to indicate the relative direction of the previously viewed portion. For example, a small arrow shaped icon placed just inside the displayed content window could indicate that the previous portion of content lies in that direction. The size of such a directional artifact might indicate the relative distance to the previous portion, such that a small arrow might indicate a nearby portion, and a large arrow might indicate a distant portion.

Artifacts can be made active by allowing the user to select the artifact to take some predetermined or user-specified action. For example, the user might click on the directional artifacts described above in order to return to the previous portion of content. In this case, the artifacts would function essentially like the "Previous" button on many web browsers. For another example, the artifact might operate to perform a relevant command, such as the "Find next match" command available in many word processing programs.

Other characteristics of the artifact that can be manipulated include its size, shape, brightness, and hue. Artifacts need not be static, but can be animated to convey their intended meaning. For example, a hairline might flash for a few seconds, giving the user just enough time to find his place before disappearing. Another example is an animated icon in the text, indicating some function for the icon. Further, artifacts might fade over time, so that they are less likely to disturb users reading the document.

Modifications to the content background also can be used to differentiate between previously viewed and newly presented content. FIG. 11A shows one example, where the background 1101 has been tinted a different shade to emphasize the boundary 1102 between the previously viewed content 1103 and the newly presented content 1104. FIG. 11B shows another example, where the background tinting is done only to a single line 1112 at the boundary of the previously viewed and newly presented content. Background attributes that can be modified to indicate the location of the previously viewed content depend on the particular application, but might include brightness, hue, pattern, or any combination thereof. Alternatively, or in addition, modifications of the background of the newly presented content could be applied to differentiate between old and new content. For example, the newly presented content might be highlighted while the previously viewed content is displayed normally or highlighted in a different color.

Foreground modifications similarly can be used to differentiate between the previously viewed and newly presented content. FIG. 12A shows an example where the font of the new text 1201 has been made bold. FIG. 12B shows this method applied to a single line of text at the boundary between the previously viewed and newly presented text 1202. As with background modifications, either the foreground of the newly presented content or the foreground of the previously viewed content can be modified. The attributes of the foreground that might be manipulated are application dependent, but might include brightness, hue, pattern, font characteristics, graphics characteristics, or any combination thereof.

Modifications to the content background, the foreground, or both background and foreground need not be static, but can be animated to convey their intended meaning. For example, a background shade might flash for a few seconds, giving the user just enough time to find her place before disappearing. Another example is an animated icon in the background, indicating some function for the icon. Further, modifications to the background or foreground might fade over time, so that they are less likely to disturb users reading the document.

The techniques and methods described here are advantageous also when a user is scrolling, horizontally or vertically, near the edges of a document. In this case, depicted in the before and after screen shots of respectively, FIGS. 13A and 13B, the user is viewing in window 1300 a portion of content 1301 near the right edge of the document 1302. As shown in FIG. 13B, when the user scrolls to the right, the new portion to be displayed 1303 contains about half of the old portion 1301. Because the boundary 1304 between the old and new content is in the middle of the newly displayed content portion 1303, rather than the expected location near the left edge 1305 of the window 1300, the user essentially will be forced to search the window 1300 until the new content is found. The edge problem may exist at any edge (e.g., top, bottom, left, right) of a piece of content, regardless of the shape of the content. This edge problem arises frequently in applications, such as Adobe Acrobat Reader, that present content as individual pages disconnected from the rest of the content. In this case, the user may have a set of controls for navigating within a single page, and another set of controls for switching pages. Furthermore, the likelihood of encountering the edge problem rises dramatically in any application in which the user navigates within a single page, or scrolls more than a page through a document when there is less than a page available to scroll.

Further, the methods and techniques described here facilitate the use of displayed content that is repetitive or having portions that are not easily differentiable, as in the case of a spreadsheet full of numbers or a graphics document with a repeating pattern. In these examples, without the benefit of differentiation techniques, the new content and old content would be difficult to differentiate due to their visual similarity.

Any of these methods can be applied in combination with any of the other methods. For example, an implementation might shade the background of the previously viewed content and also insert a hairline at the border for a few seconds.

The techniques described here also can be applied when the user gives commands that result in modifications of the displayed content, the appearance of the displayed content, the window, or some combination thereof. For example, if the user adds content in the middle of a page, as in a cut-and-paste operation, the application can treat the original contents of the screen as the previously displayed content and the additional content as the newly presented content. FIG. 14 shows an example of this operation, where a few lines of text 1401 have been inserted into the middle of the previously displayed content 1402, which has its background shaded. Another alternative is to display an artifact along one of the edges of the newly inserted content. If content is deleted, an artifact might be inserted in the displayed content to indicate the former location of the deleted content. Such an artifact might be associated with an "Undo" command that would restore the deleted content when activated.

Further, if the displayed content is modified, the location of the previously displayed content (i.e., prior to modification) can be made apparent with the techniques described herein. For example, the background of unchanged text can be shaded while the background of the modified text can remain normal. In order to ensure that the display does not get too complicated, the application could make use of a time delay associated with the various techniques to track only the most recent changes. For example, in an application that emphasizes the location of sections of a displayed content that are currently being modified, any content portion that has not been modified in a user-specified number of seconds is treated as unmodified and is displayed with a shaded background.

In addition, the techniques described here can be applied when the window containing the displayed content is modified in some manner. For example, if the size of the window is expanded, the portions of the content newly exposed can be considered new content. If the size of the window is reduced, the application may have to be readjusted to fit into the new confines, thus causing the content to be displayed in a new manner. In that case, one or more of the foregoing techniques could be used to differentiate content previously visible from content newly visible.

The techniques described here may be fine-tuned to improve the user's ability to perform the task at hand. For example, persistent background tinting of the previously displayed content may be distracting when the user is scrolling quickly through the content. In such a case, the application can include a delay before adding the visual indicator—that is, the display state must remain unchanged for a certain length of time before any content differentiating indications would be displayed. Moreover, if following a change in viewing state, the user commences manipulation (e.g., editing of the content before a predetermined time period has elapsed), content differentiation could be suppressed for this viewing state change. The underlying assumption here is that no content differentiation is needed since the user presumably located the desired location in the document.

The techniques described here can be implemented to be selectable as user preferences. For example, the user could choose from a selection of options corresponding to each of the techniques supported by the application. The user could then select those options that improve his ability to use the application to view and modify the content.

The techniques, methods, and systems described here may find applicability in any computing or processing environment in which electronic content may be viewed, accessed, or otherwise manipulated. For instance, the concept of visually determining the boundaries of the previous portion of content while navigating could be applied whenever a body of content too large to fit on a single screen is being accessed via a display monitor. One such instance is in computer-aided design (CAD) applications where the plans for an entire building are being edited or displayed.

Various implementations of the systems and techniques described here may be realized in digital electronic circuitry, or in computer hardware, firmware, software, or in combinations thereof A system or other apparatus that uses one or more of the techniques and methods described here may be implemented as a computer-readable storage medium, configured with a computer program, where the storage medium so configured causes a computer system to operate on input and/or generate output in a specific and predefined manner. Such a computer system may include one or more programmable processors that receive data and instructions from, and transmit data and instructions to, a data storage system, and suitable input and output devices. Each computer program may be implemented in a high-level procedural or object-oriented programming language, or in assembly or machine language if desired; and in any case, the language may be a compiled or interpreted language. Suitable processors include, by way of example, both general and special purpose microprocessors.

Generally, a processor will receive instructions and data from a read-only memory and/or a random access memory. Storage devices suitable for tangibly embodying computer instructions and data include all forms of non-volatile memory, including semiconductor memory devices, such as EPROM, EEPROM, and flash memory devices; magnetic disks such as internal hard disks and removable disks; magneto-optical disks; and CD-ROM disks.

These elements also can be found in a conventional desktop or workstation computer 108 as well as other computers suitable for executing computer programs implementing the methods described here, which can be used in conjunction with any content viewing or manipulation software, or any other software capable of displaying portions of a larger body of content. Any of the foregoing may be supplemented by, or implemented in, specially designed ASICs (application specific integrated circuits). The systems and techniques may be implemented as a standalone utility or plug-in utility. Likewise, the systems and techniques may be implemented at the operating system level or as a feature of an application.

A number of embodiments have been described. Nevertheless, it will be understood that various modifications may be made without departing from the spirit and scope of the invention. For example, advantageous results still could be achieved if steps of the disclosed techniques were performed in a different order and/or if components in the disclosed systems were combined in a different manner and/or replaced or supplemented by other components. Accordingly, other embodiments are within the scope of the following claims.

What is claimed is:

1. A computer-implemented method of facilitating a user's viewing of content on a display monitor, the method comprising:

displaying a first portion of a body of content in a content display area defining a view of the body of content, the content display area being operable to navigate through the body of content and being independent of other viewing areas on the display monitor;

receiving a request to change the view of the body of content; and in response to the request, changing the view of the body of content to display in the content display area a second portion of the body of content, and displaying in the content display area a visual indication indicating how the view of the body of content has changed;

wherein the content display area is an inner pane in a user interface window that includes one or more items appearing around the inner pane.

2. The method of claim 1, in which the body of content comprises text displayed by a word processor.

3. The method of claim 1, in which the body of content comprises text displayed by a document viewer.

4. The method of claim 1, in which the body of content comprises graphic images displayed by a graphics editor or viewer.

5. The method of claim 1, in which the body of content comprises multimedia content.

6. The method of claim 1, in which the body of content comprises an electronic document.

7. The method of claim 6, in which the electronic document comprises a portable document format (PDF) file.

8. The method of claim 1, in which the body of content is stored locally at the user's own client system.

9. The method of claim 1, in which the body of content is stored remotely at one or more server systems.

10. The method of claim 1, in which the request comprises a command from a user input device.

11. The method of claim 1, in which the request comprises a command from a graphical widget displayed in a graphical user interface.

12. The method of claim 11, in which the graphical widget comprises an element that displays information and invites, accepts, and responds to user actions.

13. The method of claim 11, in which the command causes a scrolling operation to occur in one or more directions.

14. The method of claim 11, in which the graphical user interface facilitates user interaction with an operating system and application programs.

15. The method of claim 11, in which the graphical widget comprises one or more elements selected from the group consisting of icons, pull-down menus, buttons, selection boxes, progress indicators, on-off checkboxes, scrollbars, windows, window edges, toggle buttons, and forms.

16. The method of claim 1, in which the request comprises a command from a software tool that may be selected from a menu or entered using a keyboard.

17. The method of claim 1, in which the second portion partially overlaps the first portion.

18. The method of claim 1, in which the second portion is disjoint and adjacent to the first portion.

19. The method of claim 1, in which the second portion is disjoint and separated from the first portion.

20. The method of claim 1, in which the second portion is offset from the first portion in a vertical direction, a horizontal direction, or a combination of both directions.

21. The method of claim 1, in which the visual indication comprises an artifact displayed in the content display area that indicates a boundary between the first portion and at least a part of the second portion.

22. The method of claim 21, in which the artifact comprises a cursor, a bookmark, an arrow, a line, or any combination thereof.

23. The method of claim 21, in which the artifact comprises a graphical icon, text, or a combination of a graphical icon and text.

24. The method of claim 21, in which the artifact indicates a direction of the second portion to the first portion.

25. The method of claim 21, in which the artifact indicates a distance from the second portion to the first portion.

26. The method of claim 21, in which the artifact takes a predetermined or user-specified action.

27. The method of claim 26, in which the action taken by the artifact returns the user to the first portion.

28. The method of claim 21, in which the artifact comprises an animation that conveys information about the artifact.

29. The method of claim 21, in which characteristics of the artifact are changeable by the user.

30. The method of claim 29, in which artifact characteristics include an artifact's size, shape, brightness, and hue.

31. The method of claim 1, in which the visual indication comprises a modification of a background associated with the first portion, the second portion, or both.

32. The method of claim 31, in which the background modification comprises a modification of tint of the background.

33. The method of claim 31, in which the background modification comprises altering a brightness, hue, pattern, or any combination thereof of the background.

34. The method of claim 32, in which the background of the first portion is altered in a different manner from the background of the second portion.

35. The method of claim 1, in which the visual indication comprises a modification to a foreground of the first portion, the second portion, or both.

36. The method of claim 35, in which the foreground modification comprises an alteration in brightness, hue, pattern, font characteristics, graphics characteristics, or any combination thereof.

37. The method of claim 1, in which the visual indication distinguishes one or more boundaries of the first portion.

38. The method of claim 1, in which the visual indication distinguishes a direction of the first portion relative to the second portion.

39. The method of claim 1, in which the visual indication distinguishes a distance of the first portion relative to the second portion.

40. The method of claim 1, in which the request comprises a command that causes a resizing of the window bounding the body of content.

41. The method of claim 1, in which the content display area is bounded by the user interface window and the body of content is displayed in the inner pane of the user interface window.

42. The method of claim 1 wherein the items appearing around the inner pane include one or more of a toolbar, a scrollbar, a status bar, a menu, a border, and another pane.

43. A computer-implemented system for facilitating a user's viewing of content on a display monitor, the system comprising:
   a storage device configured to store a body of content;
   a processor configured to:
      display a first portion of the body of content in a content display area defining a view of the body of content, the content display area being operable to navigate through the body of content and being independent of other viewing areas in the display monitor,
      receive a request to change the view of the body of content, and
      in response to the request,
      change the view of the body of content to display in the content display area a second of the body of content, and
      display in the content display area a visual indication indicating how the view of the body of content has changed,
   wherein the content display area is an inner pane in a user interface window including one or more items appearing around the inner pane.

44. Computer software, tangibly embodied in a computer-readable medium or a propagated carrier signal, for facilitating a user's viewing of content on a display monitor, the software comprising instructions to perform the following operations:
   display a first portion of a body of content in a content display area defining a view of the body of content, the content display area being operable to navigate through the body of content and being independent of other viewing areas in the display monitor;
   receive a request to change the view of the body of content; and in response to the request,
   change the view of the body of content to display in the content display area a second content portion of the body of content, and
   display in the content display area a visual indication indicating how the view of the body of content has changed;
wherein the content display area is an inner pane in a user interface window including one or more items appearing around the inner pane.

45. The computer software of claim 44, in which the request comprises a command from a graphical widget displayed in a graphical user interface.

46. The computer software of claim 45, in which the graphical user interface facilitates user interaction with an operating system and application programs.

47. The computer software of claim 45, in which the graphical widget comprises one or more elements selected from the group consisting of icons, pull-down menus, buttons, selection boxes, progress indicators, on-off checkboxes, scrollbars, windows, window edges, toggle buttons, and forms.

48. The computer software of claim 45, in which the graphical widget comprises an element that displays information and invites, accepts, and responds to user actions.

49. The computer software of claim 45, in which the command causes a scrolling operation to occur in one or more directions.

50. The computer software of claim 44 in which the second portion partially overlaps the first portion.

51. The computer software of claim 44, in which the second portion is disjoint and adjacent to the first portion.

52. The computer software of claim 44, in which the second portion is disjoint and separated from the first portion.

53. The computer software of claim 44, in which the second portion is offset from the first portion in a vertical direction, a horizontal direction, or a combination of both directions.

54. The computer software of claim 44, in which the visual indication comprises an artifact displayed in the content display area that indicates a boundary between the first portion and at least a part of the second portion.

55. The computer software of claim 54, in which the artifact comprises a cursor, a bookmark, an arrow, a line, or any combination thereof.

56. The computer software of claim 54, in which the artifact comprises a graphical icon, text, or a combination of a graphical icon and text.

57. The computer software of claim 54, in which the artifact indicates a direction of the second portion to the first portion.

58. The computer software of claim 54, in which the artifact indicates a distance from the second portion to the first portion.

59. The computer software of claim 54, in which the artifact comprises an animation that conveys information about the artifact.

60. The computer software of claim 54, in which characteristics of the artifact are changeable by the user.

61. The computer software of claim 60, in which artifact characteristics include an artifact's size, shape, brightness, and hue.

62. The computer software of claim 44, in which the visual indication comprises a modification of a background associated with the first portion, the second portion, or both.

63. The computer software of claim 44, in which the visual indication comprises a modification to a foreground of the first portion, the second portion, or both portions.

64. The computer software of claim 44, in which the visual indication distinguishes one or more boundaries of the first portion.

65. The computer software of claim 44, in which the visual indication distinguishes a direction of the first portion relative to the second portion.

66. The computer software of claim 44, in which the visual indication distinguishes a distance of the first portion relative to the second portion.

67. The computer software of claim 44, in which the request comprises a command that causes a resizing of the window bounding the body of content.

68. A computer-implemented method of facilitating a user's viewing of content on a display monitor, the method comprising:
   displaying a first portion of a body of content in a content display area defining a view of the body of content, the content display area being operable to navigate through the body of content and being independent of other viewing areas in the display monitor;
   receiving a request to change the view of the body of content;
   in response to the request,
   changing the view of the body of content to display in the content display area a second portion of the body of content; and
   superimposing a visual indication in the body of content displayed in the content display area, the visual indication indicating how the view of the body of content has changed.

69. The method of claim 68 wherein the visual indication is superimposed between the display of the first portion and a part of the second portion that differs from the first portion.

70. The method of claim 68 in which the visual indication comprises an artifact displayed in the content display area that indicates a boundary between the first portion and at least part of the second portion.

71. The method of claim 70 in which the artifact comprises a cursor, a bookmark, an arrow, a line, or any combination thereof.

72. The method of claim 70 in which the artifact comprises a graphical icon, text, or a combination of a graphical icon and text.

73. The method of claim 68 in which the visual indication comprises a modification of a background associated with the first portion, the second portion, or both.

74. The method of claim 68 in which the visual indication comprises a modification of a foreground of the first portion, the second portion, or both.

75. The method of claim 68 in which the visual indication distinguishes one or more boundaries of the first portion.

76. A computer-implemented system for facilitating a user's viewing of content on a display monitor, the system comprising:
   a storage device configured to store a body of content;
   a processor configured to:
      display a first portion of a body of content in a content display area defining a view of the body of content, the content display area being operable to navigate through the body of content and being independent of other viewing areas in the display monitor;
      receive a request to change the view of the body of content;
      in response to the request,
         change the view of the body of content to display in the content display area a second portion of the body of content; and superimpose a visual indication in the body of content displayed in the content display area, the visual indication indicating how the view of the body of content has changed.

77. Computer software, tangibly-embodied in a computer-readable medium or a propagated carrier signal, for facilitating a user's viewing of content on a display monitor, the software comprising instructions to perform the following operations:

display a first portion of a body of content in a content display area defining a view of the body of content, the content display area being operable to navigate through the body of content and being independent of other viewing areas in the display monitor;

receive a request to change the view of the body of content;

in response to the request,
    change the view of the body of content to display in the content display area a second portion of the body of content; and superimpose a visual indication in the body of content displayed in the content display area, the visual indication indicating how the view of the body of content has changed.

* * * * *